United States Patent
Kanayama

(10) Patent No.: US 11,472,389 B2
(45) Date of Patent: Oct. 18, 2022

(54) CONTROLLER AND CONTROL METHOD FOR VEHICLE

(71) Applicant: TOYOTA JIDOSHA KABUSHIKI KAISHA, Toyota (JP)

(72) Inventor: Takeshi Kanayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 387 days.

(21) Appl. No.: 16/695,421

(22) Filed: Nov. 26, 2019

(65) Prior Publication Data

US 2020/0223412 A1 Jul. 16, 2020

(30) Foreign Application Priority Data

Jan. 10, 2019 (JP) .............................. JP2019-002360

(51) Int. Cl.
| | |
|---|---|
| *B60T 8/00* | (2006.01) |
| *B60T 8/52* | (2006.01) |
| *B60T 8/32* | (2006.01) |
| *B60W 10/06* | (2006.01) |
| *B60W 10/18* | (2012.01) |

(52) U.S. Cl.
CPC .............. *B60T 8/52* (2013.01); *B60T 8/3255* (2013.01); *B60W 10/06* (2013.01); *B60W 10/18* (2013.01); *B60W 2710/0666* (2013.01); *B60W 2710/18* (2013.01)

(58) Field of Classification Search
CPC ........ B60T 8/52; B60T 8/3255; B60W 10/06; B60W 10/18; B60W 2710/0666; B60W 2710/18
See application file for complete search history.

(56) References Cited

U.S. PATENT DOCUMENTS

| | | | |
|---|---|---|---|
| 2006/0196712 A1* | 9/2006 | Toyota | .................... B60L 3/108 180/165 |
| 2008/0076623 A1* | 3/2008 | Tabata | .................... B60L 15/20 477/5 |

FOREIGN PATENT DOCUMENTS

| | | |
|---|---|---|
| JP | 2013-187959 A | 9/2013 |
| JP | 2017-221056 A | 12/2017 |

\* cited by examiner

*Primary Examiner* — Truc M Do
(74) *Attorney, Agent, or Firm* — Oblon, McClelland, Maier & Neustadt, L.L.P.

(57) ABSTRACT

A controller for a vehicle is provided. One of a prime mover that drives a front wheel and a prime mover that drives a rear wheel is referred to as a first prime mover, and the other one is referred to as a second prime mover. The controller generates, when a required torque required for a drive wheel of the vehicle is a braking torque, the braking torque from the first prime mover. The controller limits, when the required torque changes from the braking torque to a driving torque, an increase in the driving torque generated from the first prime mover during a set period. The controller generates, from the second prime mover that does not generate the braking torque, the driving torque required during execution of the torque limit process.

10 Claims, 11 Drawing Sheets

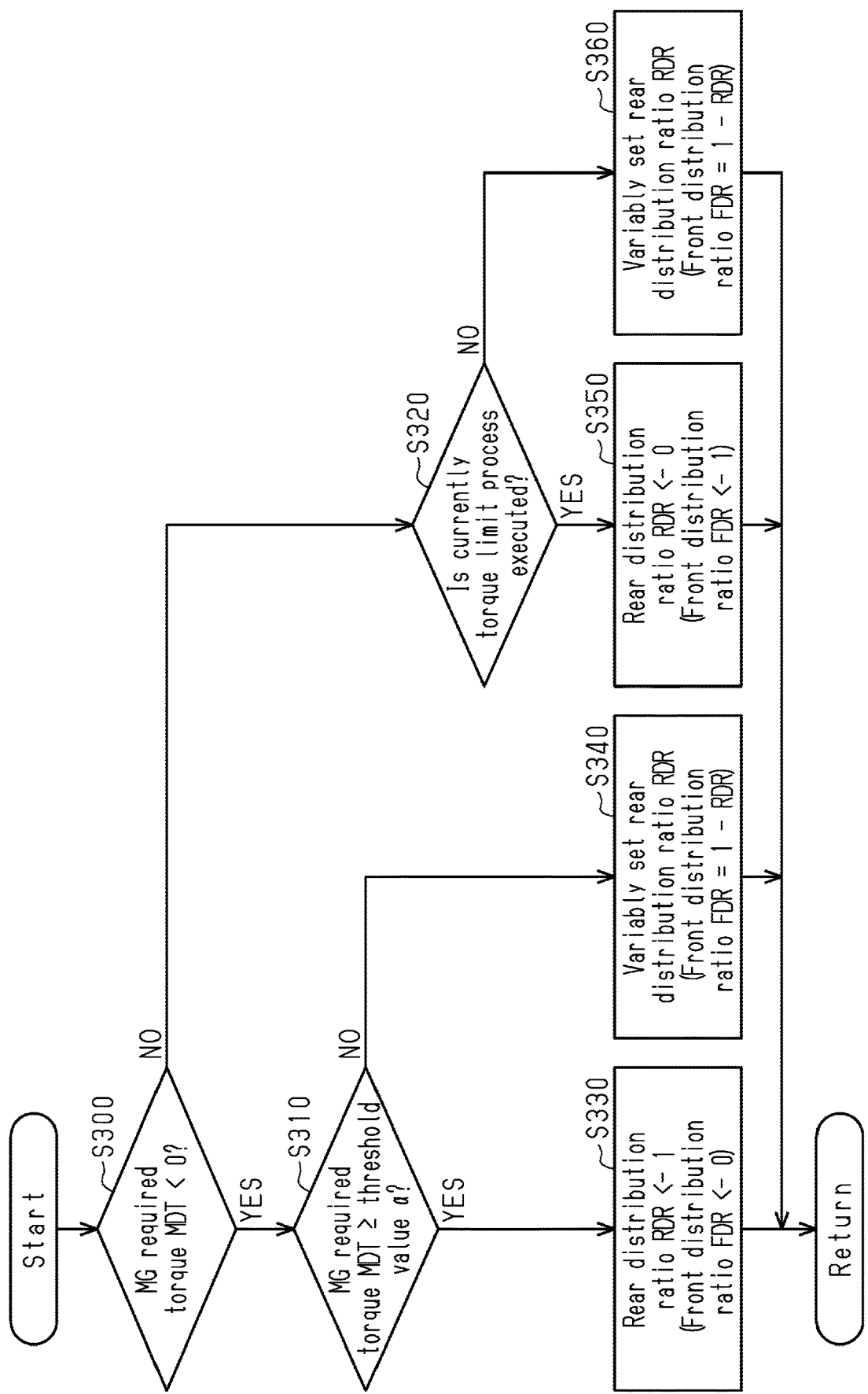

CONTROLLER AND CONTROL METHOD FOR VEHICLE

BACKGROUND

1. Field

The following description relates to a controller for a vehicle and a method for controlling a vehicle.

2. Description of Related Art

When a required torque required for the drive wheels of a vehicle changes from a braking torque to a driving torque, the direction of torque acting on a vehicle drive system is reversed. Thus, torque shock easily occurs in the vehicle. Japanese Laid-Open Patent Publication No. 2013-187959 describes an example of a vehicle in which when the required torque changes from the braking torque to the driving torque, a torque limit process is executed to limit an increase in the driving torque. The driving torque of which the increase is limited is generated from a prime mover that drives the drive wheels. Executing the torque limit process during a set period prevents the generation of such torque shock.

However, since an increase in the driving torque is limited during the execution of the torque limit process, the responsivity of a vehicle driving force is reduced when the required torque changes from the braking torque to the driving torque.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1

A controller for a vehicle provided according to one aspect of the present disclosure is applied to a vehicle including a prime mover that drives a front wheel and a prime mover that drives a rear wheel. One of the prime mover that drives the front wheel and the prime mover that drives the rear wheel is referred to as a first prime mover, and the other one of the prime mover that drives the front wheel and the prime mover that drives the rear wheel is referred to as a second prime mover. The controller is configured to execute a process for generating, when a required torque required for a drive wheel of the vehicle is a braking torque, the braking torque from the first prime mover, a torque limit process for limiting, when the required torque changes from the braking torque to a driving torque, an increase in the driving torque generated from the first prime mover during a set period, and a process for generating, from the second prime mover that does not generate the braking torque, the driving torque required during execution of the torque limit process.

In the above-described configuration, during the execution of the torque limit process, the required driving torque is generated from the second prime mover, which does not generate the braking torque. Thus, during the execution of the torque limit process, the driving torque can be obtained. This improves the responsivity of a driving force of the vehicle when the required torque changes from the braking torque to the driving torque.

Before starting the torque limit process, the second prime mover does not generate the braking torque. Thus, when the driving torque is generated from the second prime mover as the torque limit process starts, the driving torque of the second prime mover increases from a state in which the generated torque is approximately 0. The above-described configuration is compared with, for example, a comparative example having a configuration in which the braking torque is generated from the second prime mover before the torque limit process starts so that the generated torque of the second prime mover is negative before the torque limit process starts. In the above-described configuration, changes in the torque are small in the second prime mover when the driving torque is generated from the second prime mover. This prevents the generation of torque shock in the vehicle caused by the torque changes in the second prime mover.

Example 2

The controller according to example 1 may execute a process for generating some of the braking torque from the first prime mover and generate the remaining braking torque from the second prime mover when an absolute value of the braking torque exceeds a set threshold value. It is preferred that even if the required braking torque is obtained only by the first prime mover, a value that allows for a proper determination that the position of the vehicle does not become unstable be used as the threshold value in the above-described configuration.

In the above-described configuration, when the absolute value of the required braking torque exceeds the set threshold value and braking torque is generated only by the first prime mover, the contact state of the drive wheel driven by the first prime mover may be unstable and the position of the vehicle may be unstable. In this case, the following advantage is gained. That is, when the position of the vehicle may be unstable in this manner, some of the braking torque is generated from the first prime mover and the remaining braking torque is generated from the second prime mover. Accordingly, the required braking torque is borne by both the front wheels and the rear wheels. Thus, as compared to, for example, when the braking torque having an absolute value exceeding the threshold value is generated only from the first prime mover, the contact states of the front wheels and the rear wheels are stable. This stabilizes the position of the vehicle.

Example 3

The controller according to example 1 may execute a process for generating a braking torque corresponding to a set threshold value from the first prime mover and generating a braking torque corresponding to an amount exceeding the threshold value from the second prime mover when an absolute value of the braking torque exceeds the threshold value. It is preferred that even if the required braking torque is obtained only by the first prime mover, a value that allows for a proper determination that the position of the vehicle does not become unstable be used as the threshold value in the above-described configuration.

In the above-described configuration, when the absolute value of the required braking torque exceeds the set threshold value and braking torque is generated only by the first prime mover, the contact state of the drive wheel driven by the first prime mover may be unstable and the position of the vehicle may be unstable. In this case, the following advantage is gained. That is, some of the braking torque, which corresponds the threshold value, is generated from the first prime mover and the remaining braking torque is generated from the second prime mover. Thus, as compared to, for example, when the braking torque having an absolute value exceeding the threshold value is generated only from the first prime mover, the contact states of the front wheels and the rear wheels are stable. This stabilizes the position of the vehicle.

Further, the following advantage is gained by setting the braking torque generated from the first prime mover to the threshold value. That is, the contact state of the drive wheel driven by the first prime mover is stabilized while maximizing the braking torque generated from the first prime mover.

Example 4

The controller according to any one of examples 1 to 3 may execute a process for calculating an operation braking torque that is a braking torque corresponding to an operation amount of a brake pedal in a case in which the brake pedal is operated while the vehicle is traveling, a process for generating the operation braking torque from the second prime mover until a given period has elapsed from when the brake pedal started to be operated, and a process for generating some of the braking torque of the operation braking torque from the second prime mover and generating the remaining braking torque from the first prime mover after the given period has elapsed.

In the above-described configuration, the required operation braking torque is first operated from the second prime mover at an initial stage until the given period has elapsed since the beginning of the operation of the brake pedal. When the given period has elapsed, the operation braking torque is divided into the braking torque generated from the second prime mover and the braking torque generated from the first prime mover. Thus, the braking torque is given to both the front wheels and the rear wheels. For example, the above-described configuration is compared to a configuration in which the operation braking torque is divided into the braking torque generated from the second prime mover and the braking torque generated from the first prime mover from the initial stage in which the brake pedal was operated. The above-described configuration reduces the braking torque finally borne by the drive wheel of the first prime mover in the required operation braking torque.

In another comparative example, even if the brake pedal is not operated while the vehicle is traveling, the drive wheel of the first prime mover has been already given the braking torque. For example, the braking torque corresponding to the engine brake during coasting has been given the drive wheel of the first prime mover. In such a case, when the operation braking torque generated by operating the brake pedal is further added to the drive wheel of the first prime mover to excessively increase the braking torque of the drive wheel, the contact state of the drive wheel becomes unstable. This may destabilize the position of the vehicle. As described above, the above-described configuration reduces the braking torque borne by the drive wheel of the first prime mover in the required operation braking torque. This prevents the position of the vehicle from becoming unstable.

Example 5

The controller according to any one of examples 1 to 3 may execute a process for calculating an operation braking torque that is a braking torque corresponding to an operation amount of a brake pedal in a case in which the brake pedal is operated while the vehicle is traveling and a process for generating some of the braking torque of the operation braking torque from the second prime mover and generating the remaining braking torque from the first prime mover after the brake pedal starts to be operated.

In the above-described configuration, the operation braking torque is distributed to both the front wheels and the rear wheels. Thus, for example, as compared to when the operation braking torque is all given to only the front wheels or the rear wheels, the contact states of the front wheels and the rear wheels are stable in the above-described configuration. This stabilizes the position of the vehicle when the brake pedal is operated.

Example 6

A method for controlling a vehicle that executes various processes according to any one of Examples 1 to 5 is provided.

Example 7

A non-transitory computer readable storage medium that stores a program that causes the controller to perform various processes according to any one of Examples 1 to 6 is provided.

Other features and aspects will be apparent from the following detailed description, the drawings, and the claims.

BRIEF DESCRIPTION OF THE DRAWINGS

FIG. 4 is a flowchart illustrating a procedure for processes executed by the controller of FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller 100 for a vehicle 500 according to a first embodiment of the present disclosure will now be described with reference to FIGS. 1 to 5.

Figure 1:
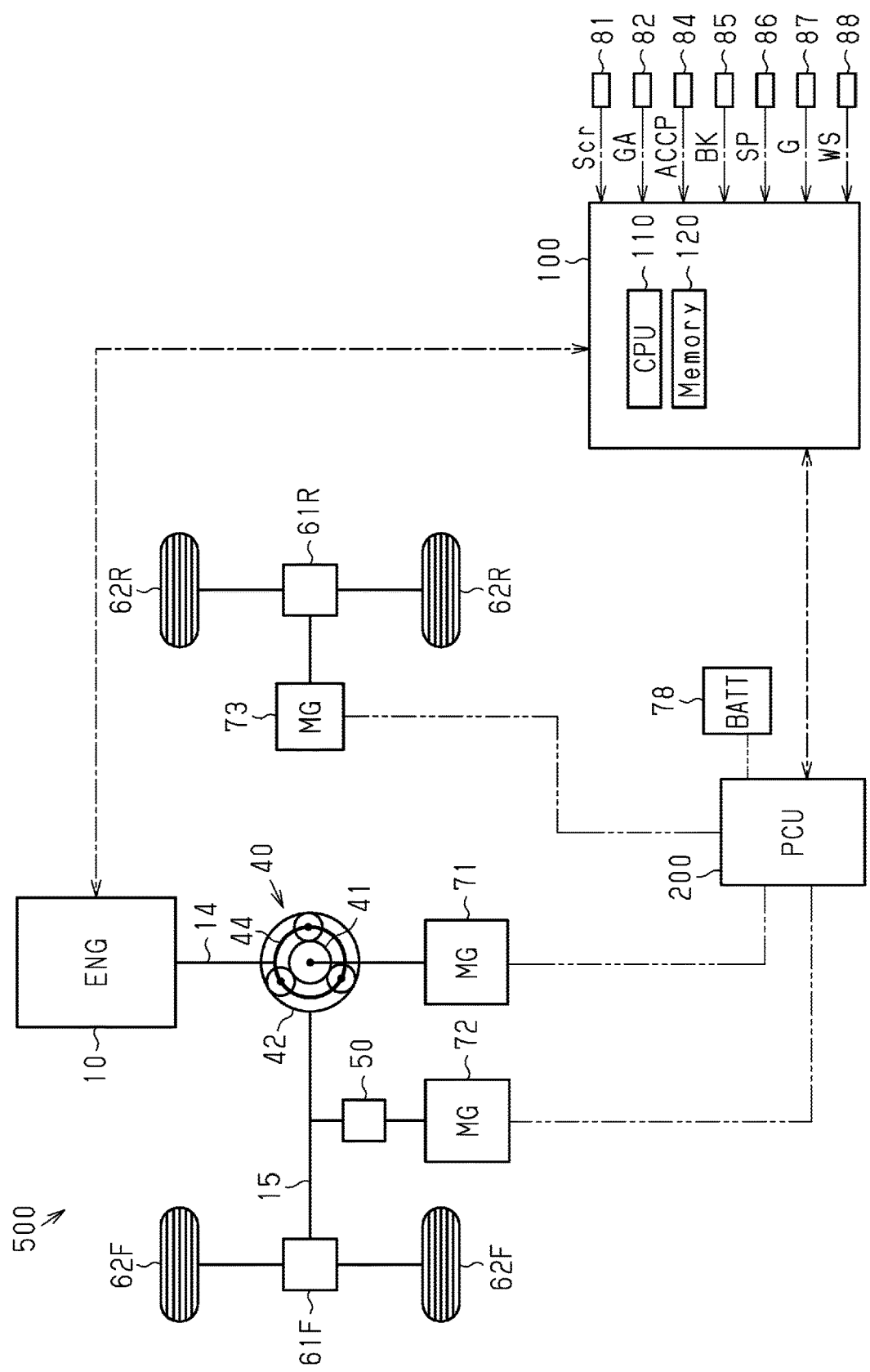
FIG. 1 is a schematic diagram showing the configuration of a vehicle that includes a controller according to a first embodiment of the present disclosure.

As shown in FIG. 1, the vehicle 500 includes an internal combustion engine 10, a first motor generator (MG) 71, and a second MG 72 as prime movers that drive left and right front wheels 62F. The first MG 71 and the second MG 72 are two motor generators that are electric motors and power generators.

The vehicle 500 also includes a third MG 73 as a prime mover that drives left and right rear wheels 62R. The third MG 73 is an electric motor and a power generator.

The vehicle 500 includes a planetary gear 40. The planetary gear 40 includes a sun gear 41 and a ring gear 42, which is arranged coaxially with the sun gear 41. Pinion gears that mesh with both the sun gear 41 and the ring gear 42 are arranged between the sun gear 41 and the ring gear 42. Each pinion gear is supported by a carrier 44.

The carrier 44 is connected to a crankshaft 14 of the internal combustion engine 10. The sun gear 41 is connected to a rotor of the first MG 71. The ring gear 42 is connected to a drive shaft 15. The drive shaft 15 is connected to the left and right front wheels 62F by a differential gear 61F. The first MG 71 is a power generator that generates power using outputs of the internal combustion engine 10 and is a starter (electric motor) for starting the internal combustion engine 10.

A rotor of the second MG 72 is connected to the drive shaft 15 by a reduction drive 50. The second MG 72 is an electric motor that generates the driving force of the front wheels 62F and is a power generator that generates power using a regeneration brake when the speed of the vehicle 500 is reduced.

A rotor of the third MG 73 is connected to the left and right rear wheels 62R by a differential gear 61R. The third MG 73 is an electric motor that generates the driving force of the rear wheels 62F and is a power generator that generates power using a regeneration brake when the speed of the vehicle 500 is reduced.

The first MG 71, the second MG 72, and the third MG 73 supply and receive power to and from a battery 78 by a power control unit (PCU) 200. The PCU 200 includes, for example, a boost converter and an inverter. The boost converter boosts and outputs direct-current voltage input from the battery 78. The inverter converts the direct-current voltage boosted by the boost converter into alternating-current voltage and outputs it to each of the MGs 71, 72, and 73.

The control of the internal combustion engine 10 and the control of the first MG 71, the second MG 72, and the third MG 73 using the PCU 200 are executed by the controller 100, which is equipped with the vehicle 500.

The controller 100 includes a central processing unit (hereinafter referred to as a CPU) 110 and a memory 120, which stores programs and data for control. The programs stored in the memory 120 are executed by the CPU 110 to execute various types of control. Although not illustrated in the drawings, the controller 100 includes multiple control units such as a control unit for the internal combustion engine 10 and a control unit for the PCU 200.

The controller 100 is connected to a crank angle sensor 81, which detects a rotation angle of the crankshaft 14, an air flow meter 82, which detects an intake air amount GA of the internal combustion engine 10, and an acceleration position sensor 84, which detects an accelerator operation amount ACCP (the operation amount of an accelerator pedal). Further, the controller 100 includes a brake sensor 85, which detects a brake operation amount BK (the operation amount of the brake pedal), a vehicle speed sensor 86, which detects a vehicle speed SP of the vehicle 500, an acceleration sensor 87, which detects an acceleration G of the vehicle 500, and a wheel sensor 88, which detects vehicle wheel rotation speeds WS of the front wheels 62F and the rear wheels 62R. The controller 100 receives output signals from these sensors. The controller 100 calculates an engine rotation speed NE based on an output signal Scr of the crank angle sensor 81. Further, the controller 100 calculates a front wheel load FGL, which is a vertical load of each front wheel 62F, and a rear wheel load RGL, which is a vertical load of each rear wheel 62R, based on the acceleration G or the like in the front-rear direction of the vehicle 500. Furthermore, the controller 100 calculates an inclination angle SA of a travel road surface (road surface gradient) based on, for example, the acceleration G or the vehicle speed SP in the front-rear direction of the vehicle 500. Additionally, the controller 100 calculates a friction coefficient μ between each drive wheel and the road surface based on, for example, the vehicle wheel rotation speeds WS.

Figure 2:
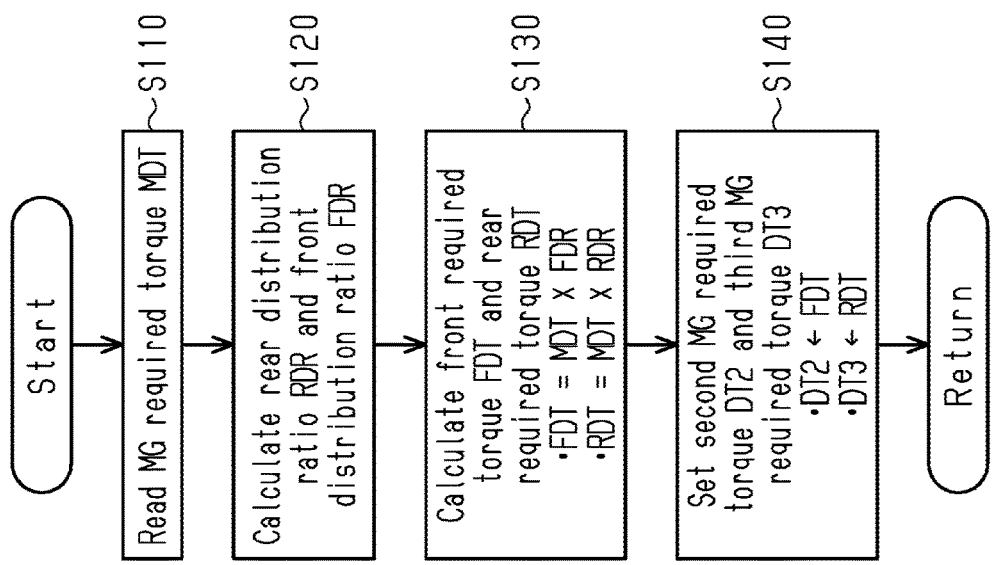
FIG. 2 is a flowchart illustrating a procedure for processes executed by the controller of FIG. 1.

FIG. 2 illustrates some of the processes for controlling the second MG 72 and the third MG 73 while the vehicle is traveling. The processes shown in FIG. 2 are implemented by the CPU 110 executing programs stored in the memory 120 of the controller 100 at given intervals.

When starting the current process, the controller 100 reads an MG required torque MDT (S110). The MG required torque MDT is the following value. That is, the controller 100 additionally calculates a vehicle required torque VDT, which is a required value for a driving force or a braking force necessary for the vehicle 500 to travel, based on the accelerator operation amount ACCP, the brake operation amount BK, the vehicle speed SP, and the like. In the vehicle required torque VDT, the required torque for the driving force or the braking force generated by the regenerative brake borne by the second MG 72 and the third MG 73 are additionally calculated as the MG required torque MDT. The MG required torque MDT is calculated so as to become optimal in accordance with, for example, the traveling state of the vehicle 500 or the charge amount of the battery 78. Further, a coast braking torque CST (described later) is calculated as one type of the MG required torque MDT. In S110, the controller 100 reads the MG required torque MDT calculated additionally in such a manner. When the operation of the internal combustion engine 10 can be stopped, the vehicle required torque VDT is set to the MG required torque MDT. In this case, the vehicle 500 is operated in an EV travel mode, in which the vehicle 500 travels using the second MG 72 and the third MG 73.

Next, the controller 100 calculates a rear distribution ratio RDR and a front distribution ratio FDR to distribute the MG required torque MDT to the front wheels 62F and the rear wheels 62R (S120). The value of the rear distribution ratio RDR varies within a range greater than or equal to 0 to less than or equal to 1 in accordance with, for example, the traveling state of vehicle and is calculated through a distribution ratio setting process, which will be described later with reference to FIG. 4. Further, the value obtained by subtracting the rear distribution ratio RDR from 1 is set as the front distribution ratio FDR (i.e., FDR=1−RDR).

Then, the controller 100 calculates the product of the MG required torque MDT and the rear distribution ratio RDR as a rear required torque RDT, which is the required torque of each rear wheel 62R, and calculates the product of the MG required torque MDT and the front distribution ratio FDR as a front required torque FDT, which is the required torque of each front wheel 62F (S130).

Subsequently, the controller 100 sets the front required torque FDT as a second MG required torque DT2, which is a required value for the driving force or the braking force of the second MG 72, and sets the rear required torque RDT as a third MG required torque DT3, which is a required value for the driving force or the braking force of the third MG 73 (S140). Then, the controller 100 temporarily ends the current process.

When the second MG required torque DT2 and the third MG required torque DT3 are set in this manner, the controller 100 performs torque control of the second MG 72 and the third MG 73 so as to obtain such types of required torque.

When the value of each of the above-described types of torque is a positive value, a driving force for accelerating the vehicle 500 and a driving force for keeping the vehicle speed constant are generated. As the positive value increases, the driving torque increases. When the value of each of the above-described types of torque is a negative value, a braking torque for decelerating vehicle 500 is generated. As the negative value decreases (i.e., the absolute value of the negative value increases), the braking torque increases. Thus, in the present embodiment, the driving torque is treated as a positive value, and the braking torque is treated as a negative value. The fact that the driving torque is large means the fact that the absolute value of the torque value of the driving torque is large and the driving force is strong. When the braking torque is large, the absolute value of the torque value of the braking torque is large and the braking force is strong.

In addition, when the accelerator operation amount ACCP is 0 and the vehicle speed SP is not 0 (i.e., when the vehicle is coasting), the controller 100 uses kinetic energy delivered from the rear wheels 62R to cause the third MG 73 to perform a regenerative operation, thereby executing a process for giving the braking for produced by the regenerative brake to the rear wheels 62R. During the coasting, torque control of the third MG 73 is performed so that the braking force generated through friction of the internal combustion engine 10 (i.e., the braking torque corresponding to the engine brake) can be obtained from the third MG 73.

Figure 3:
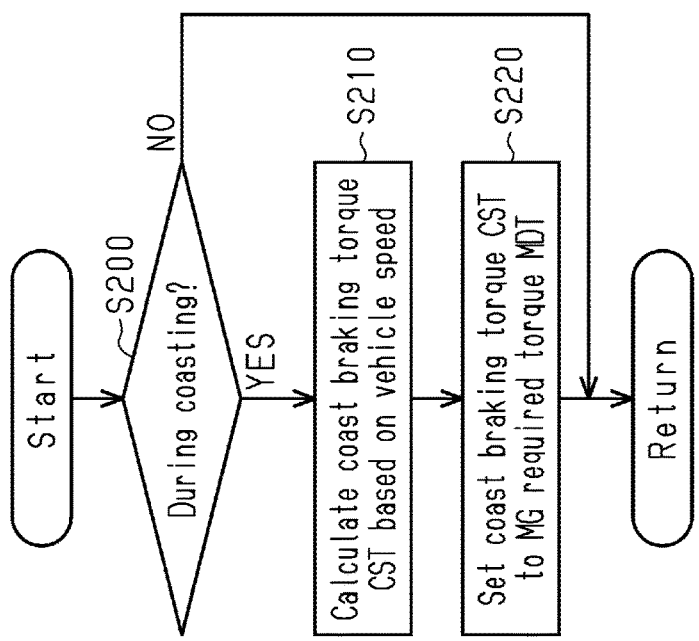
FIG. 3 is a flowchart illustrating a procedure for processes executed by the controller of FIG. 1.

FIG. 3 shows some of the processes executed by the controller 100 while the vehicle is traveling. The processes shown in FIG. 3 are implemented by the CPU 110 executing the programs stored in the memory 120 of the controller 100 at the given intervals.

When starting the current process, the controller 100 determines whether the vehicle 500 is currently coasting (S200). In S200, for example, when the accelerator operation amount is 0 and the vehicle speed SP is higher than a creeping speed SPC, the controller 100 determines that the vehicle 500 is coasting. The creeping speed SPC refers to the maximum speed (approximately several km/h) when the controller 100 causes the vehicle 500 to artificially creep using the driving force of the second MG 72 or the third MG 73 in a state in which the accelerator operation amount is 0.

When determining that the vehicle 500 is not coasting (S200: NO), the controller 100 temporarily ends the current process.

When determining that the vehicle 500 is coasting (S200: YES), the controller 100 calculates the coast braking torque CST based on the vehicle speed SP (S210). The coast braking torque CST is a negative value. The coast braking torque CST is a braking force generated through friction of the internal combustion engine 10 during coasting (i.e., the braking torque corresponding to the engine brake). The braking torque corresponding to the engine brake tends to increase as the vehicle speed increases. Thus, the controller 100 variably sets the coast braking torque CST such that the negative value of the coast braking torque CST decreases (i.e., the absolute value of the negative value of the coast braking torque CST increases) as the vehicle speed SP increases. As described above, when the coast braking torque CST is a negative value, a braking force is generated to decelerate the vehicle 500. Further, as the negative value of the coast braking torque CST decreases (i.e., the absolute value of the negative value of the coast braking torque CST increases), the braking torque increases.

Then, the controller 100 sets the calculated coast braking torque CST to the MG required torque MDT (S220) and temporarily ends the current process. After setting the coast braking torque CST to the MG required torque MDT in this manner, the controller 100 performs torque control of the third MG 73 through a series of processes (described above with reference to FIG. 2) and a distribution ratio setting process (described later with reference to FIG. 4) so that the coast braking torque CST can be obtained by the regenerative brake of the third MG 73. The third MG 73 corresponds to the above-described first prime mover.

FIG. 4 shows a procedure for the distribution ratio setting process executed by the controller 100 while the vehicle is traveling. The processes shown in FIG. 4 are implemented by the CPU 110 executing the programs stored in the memory 120 of the controller 100 at the given intervals.

When starting the current process, the controller 100 reads the MG required torque MDT that is currently being calculated and determines whether the read value is a negative value, that is, whether the braking torque is required (S300).

When determining the MG required torque MDT is a negative value (S300: YES), the controller 100 determines whether the MG required torque MDT is larger than a threshold value $\alpha$, which is set to a negative value, that is, whether the absolute value of the MG required torque MDT is less than or equal to the absolute value of the threshold value $\alpha$ (S310). The magnitude of the threshold value $\alpha$ is set to make the following determination. That is, the magnitude of the threshold value $\alpha$ is set such that the controller 100 can properly determine that the position of the vehicle 500 is not unstable even if the braking torque corresponding to the MG required torque MDT is obtained only by the regenerative brake of the third MG 73. This determination is made based on the fact that the MG required torque MDT is greater than or equal to the threshold value α. The threshold value α is smaller than the minimum value of the variably set coast braking torque CST. In other words, the absolute value of the threshold value α is larger than the absolute value of the minimum value of the coast braking torque CST.

When the controller 100 determines that the MG required torque MDT is greater than or equal to the threshold value α (i.e., |MDT|≤|α|) (S310: YES), in other words, when the position of the vehicle 500 is not unstable even if the braking torque corresponding to the MG required torque MDT is obtained only by the regenerative brake of the third MG 73, the controller 100 executes the process of S330.

In the process of S330, the controller 100 sets the rear distribution ratio RDR to 1 and sets the front distribution ratio FDR to 0. Then, the controller 100 temporarily ends the current process.

When the rear distribution ratio RDR and the front distribution ratio FDR are set in the process of S330, the braking torque corresponding to a negative MG required torque MDT (for example, the above-described coast braking torque CST) is obtained only by the regenerative brake of the third MG 73 through the process of FIG. 2. Accordingly, the braking torque obtained by the regenerative brake acts only on the rear wheels 62R.

In the process of S310, when the controller 100 determines that the MG required torque MDT is less than the threshold value α (i.e., |MDT|<|α|) (S310: NO), in other words, when the position of the vehicle 500 may be unstable even if the braking torque corresponding to the MG required torque MDT is obtained only by the regenerative brake of the third MG 73, the controller 100 executes the process of S340.

In the process of S340, the controller 100 variably sets the rear distribution ratio RDR in accordance with the traveling state or the like of the vehicle 500. For example, as the ratio of the rear wheel load RGL occupying the sum of the front wheel load FGL and the rear distribution ratio RDR increases, the controller 100 variably sets the rear distribution ratio RDR such that the value of the rear distribution ratio RDR increases. The value obtained by subtracting the rear distribution ratio RDR from 1 through the setting of the rear distribution ratio RDR is set as the front distribution ratio FDR. The current process is then temporarily ended.

When the rear distribution ratio RDR and the front distribution ratio FDR are set in the process of S340, the braking torque that corresponds to the MG required torque MDT and has an absolute value exceeding the absolute value of the threshold value α is obtained by the second MG 72 and the third MG 73 through the processes of FIG. 2. Accordingly, the braking torque obtained by the regenerative brake acts on both the front wheels 62F and the rear wheels 62R.

In the process of S300, when determining that the MG required torque MDT is not a negative value, that is, when determining that the MG required torque MDT is a positive value or 0 (S300: NO), the controller 100 determines whether a torque limit process is currently being executed (S320).

The torque limit process refers to the following process. That is, when the generated torque of the third MG 73 changes from a braking torque (negative torque) to a driving torque (positive torque), the direction of torque acting on a vehicle drive system to which the output shaft of the third MG 73 is connected may be reversed. This may generate torque shock in the vehicle 500. In order to prevent the generation of such torque shock, the controller 100 executes the torque limit process for limiting an increase in the driving torque generated from the third MG 73 when the third MG required torque DT3 changes from the braking torque to the driving torque. In the torque limit process, when the third MG required torque DT3 changes from the braking torque to the driving torque, the third MG required torque DT3 is set to 0 at the point in time the braking torque becomes 0, and the third MG required torque DT3 is maintained at 0 only during a set period Tα, which has been defined in advance. At the point in time the set period Tα elapses, the controller 100 ends the torque limit process, that is, the process of keeping the third MG required torque DT3 at 0, and then increases the third MG required torque DT3 toward a required driving torque. During the execution of the torque limit process, torque does not act on the vehicle drive system to which the output shaft of the third MG 73 is connected. In a comparative example, the torque limit process is not executed. That is, the braking torque acting on the above-described vehicle drive system gradually approximates to 0, and the driving torque is increased immediately after the braking torque becomes 0. As compared to such a comparative example, in the present embodiment, the generation of the above-described torque shock is reduced.

In S320, in a case in which the set period Tα has not elapsed from when the third MG required torque DT3 (negative value) became 0, the controller 100 determines that the torque limit process is currently being executed. When determining that the torque limit process is currently being executed (S320: YES), the controller 100 sets the rear distribution ratio RDR to 0 and sets the front distribution ratio FDR to 1 in the process of S350. Then, the controller 100 temporarily ends the current process.

When the rear distribution ratio RDR and the front distribution ratio FDR are set in the process of S350, all the MG required torque MDT (positive value) is set as the front required torque FDT through the process of FIG. 2. Accordingly, the driving torque corresponding to the MG required torque MDT is obtained by the second MG 72. The second MG 72 corresponds to the above-described second prime mover.

Since the rear distribution ratio RDR is set to 0, the rear required torque RDT becomes 0. Thus, the third MG required torque DT3 is set to 0. In this manner, the torque limit process is implemented.

In S320, in a case in which the set period Tα has elapsed from when the third MG required torque DT3 (negative value) became 0, the controller 100 determines that the torque limit process is not currently being executed. When determining that the torque limit process is not currently being executed (S320: NO), the controller 100 variably sets the rear distribution ratio RDR in the process of S360 and sets the value obtained by subtracting the rear distribution ratio RDR from 1 as the front distribution ratio FDR in accordance with the setting of the rear distribution ratio RDR. The process of S360 is the same as the process of S340. Then, the controller 100 temporarily ends the current process.

Figure 5:
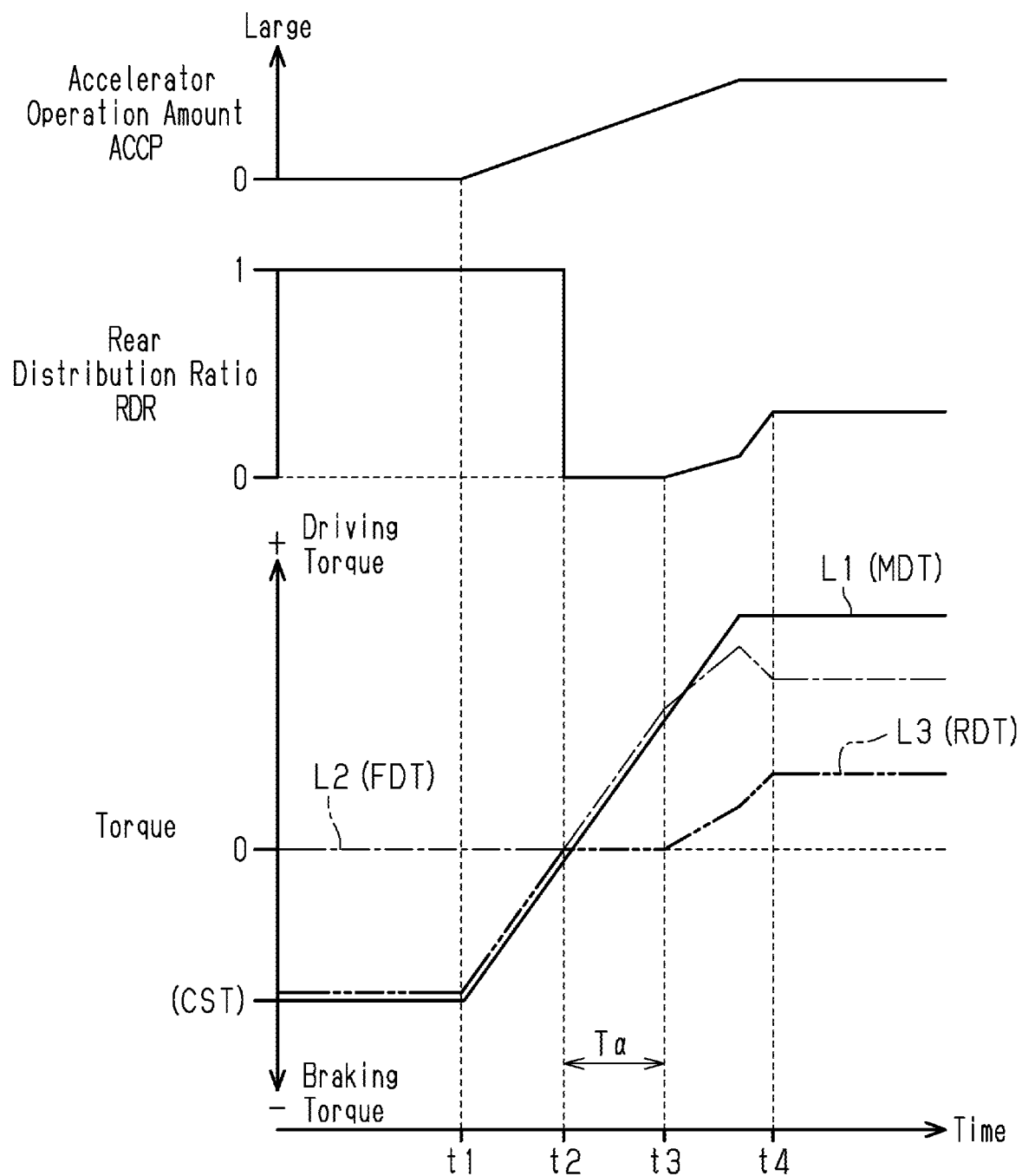
FIG. 5 is a timing chart illustrating an operation of the embodiment shown in FIG. 1.

FIG. 5 shows an operation of the distribution ratio setting process while the vehicle is traveling. In the timing diagram of torque shown in FIG. 5, the solid line L1 represents the MG required torque MDT, and the alternate long and short dashed line L2 represents the front required torque FDT (=second MG required torque DT2). The long dashed double-short dashed line L3 represents the rear required torque RDT (=third MG required torque DT3). From time t2 to time t3, the solid line L1 corresponds to the alternate long and short dashed line L2. Prior to time t2, the solid line L1 corresponds to the long dashed double-short dashed line L3. In the example of FIG. 5, the vehicle speed SP is higher than the creeping speed SPC.

Prior to time t1, since the accelerator operation amount ACCP is 0 and the vehicle speed SP is higher than the creeping speed SPC, the controller 100 determines that the vehicle 500 is currently coasting. Thus, prior to time t1, the coast braking torque CST is set as the MG required torque MDT. In this state, affirmative determinations are made in S300 and S310 of FIG. 4. Thus, when the process of S330 is executed, the rear distribution ratio RDR is set to 1 and the front distribution ratio FDR is set to 0. After the rear distribution ratio RDR is set to 1 and the front distribution ratio FDR is set to 0, the processes illustrated in FIG. 2 are executed to set all the MG required torque MDT to the rear required torque RDT. Thus, the MG required torque MDT set to the coast braking torque CST is the same as the third MG required torque DT3. Since the front required torque FDT is set to 0, the second MG required torque DT2 is set to 0. Accordingly, the braking torque corresponding to the engine brake is obtained only by the regenerative brake of the third MG 73, and the regenerative brake acts on the rear wheels 62R.

After the accelerator operation amount ACCP, which has been 0, starts to gradually increase from time t1, the MG required torque MDT (negative value) gradually increases from the coast braking torque CST as the accelerator operation amount ACCP increases. Even after the MG required torque MDT becomes 0 at time t2, the MG required torque MDT increases as a positive value corresponding to the accelerator operation amount ACCP.

From time t1 to time t2, affirmative determinations are made in S300 and S310 of FIG. 4. Thus, when the process of S330 is executed, the rear distribution ratio RDR is set to 1 and the front distribution ratio FDR is set to 0. After the rear distribution ratio RDR is set to 1 and the front distribution ratio FDR is set to 0, the processes illustrated in FIG. 2 are executed to set all the MG required torque MDT to the rear required torque RDT. This causes the MG required torque MDT to be the same as the third MG required torque DT3. Since the front required torque FDT is set to 0, the second MG required torque DT2 is set to 0. Accordingly, the braking torque is obtained only by the regenerative brake of the third MG 73, and the regenerative brake acts on the rear wheels 62R. From time t1 to time t2, since the absolute value of the MG required torque MDT (negative value) gradually decreases as the accelerator operation amount ACCP increases, the braking torque acting on the rear wheels 62R gradually decreases.

At time t2, when the MG required torque MDT becomes 0, the rear required torque RDT becomes 0. This causes the third MG required torque DT3 to become 0. Accordingly, since a negative determination is made in S300 of FIG. 4 and an affirmative determination is made in S320 of FIG. 4, the rear distribution ratio RDR is set to 0 and the front distribution ratio FDR is set to 1 by executing the process of S350.

After the rear distribution ratio RDR is set to 0 and the front distribution ratio FDR is set to 1, the processes illustrated in FIG. 2 are executed to set all the MG required torque MDT to the front required torque FDT. Accordingly, the MG required torque MDT is the same as the second MG required torque DT2. Further, since the rear required torque RDT is set to 0, the third MG required torque DT3 is set to 0 to implement the torque limit process. Thus, during the execution of the torque limit process, the driving torque corresponding to the MG required torque MDT is obtained by the second MG 72, and the driving torque of the second MG 72 acts on the front wheels 62F.

At time t3, when the torque limit process is ended, negative determinations are made in S300 and S320 of FIG. 4. Thus, the process of S360 is executed. Thus, the rear distribution ratio RDR and the front distribution ratio FDR are variably set to a value corresponding to, for example, the traveling state of the vehicle 500. Subsequent to time t3, in order to limit a sudden change in the front required torque FDT and the rear required torque RDT, a gradual changing process is performed on the rear distribution ratio RDR calculated based on the traveling state of the vehicle 500 or the like. The front distribution ratio FDR gradually changes in accordance with the gradual changing process of the rear distribution ratio RDR. After the gradual changing process ends at time t4, the rear distribution ratio RDR and the front distribution ratio FDR are set to a value corresponding to the traveling state of the vehicle 500 or the like.

The present embodiment has the following advantages.

(1) From time t2 to time t3 in FIG. 5, the MG required torque MDT is a positive torque, and the driving torque is required. However, since the third MG required torque DT3 is set to 0 in order to execute the torque limit process, the driving torque cannot be obtained in this state. In the present embodiment, during the execution of the torque limit process, the front distribution ratio FDR is set to 1. This causes the required driving torque to be generated from the second MG 72 (second prime mover) that has not generated braking torque so far. This allows the driving torque to be obtained even during the execution of the torque limit process and improves the responsivity of a vehicle driving force when the MG required torque MDT changes from the braking torque to the driving torque.

Like prior to time t2 in FIG. 5, the MG required torque MDT is a negative value and the braking torque is required before the torque limit process starts. In the present embodiment, while the braking torque is required, the rear distribution ratio RDR is set to 1 and the front distribution ratio FDR is set to 0 such that the braking torque is obtained only by the regenerative brake of the third MG 73 and the second MG required torque DT2 is set to 0. Accordingly, when the driving torque is generated from the second MG 72 as the torque limit process starts, the driving torque of the second MG 72 increases from a state in which the generated torque of the second MG 72 is 0. In a comparative example, when the braking torque obtained by the regenerative brake is generated also from the second MG 72 before the torque limit process starts, the generated torque of the second MG 72 is negative before the torque limit process starts. As compared to such a comparative example, in the present embodiment, the torque changes in the second MG 72 to a small extent when the driving torque is generated from the second MG 72. Thus, in the present embodiment, the generation of torque shock in the vehicle 500 caused by the torque changes in the second MG 72 in the comparative example is prevented.

(2) In the process of S310 of FIG. 4, when it is determined that the MG required torque MDT is less than the threshold value α (S310: NO), in other words, when the position of the vehicle 500 is unstable in a case in which the braking torque corresponding to the MG required torque MDT is obtained only by the regenerative brake of the third MG 73, the process of S340 is executed. Thus, the rear distribution ratio RDR and the front distribution ratio FDR corresponding to the traveling state of the vehicle 500 or the like are set. When the rear distribution ratio RDR and the front distribution ratio FDR are set in the process of S340, the braking torque that corresponds to the MG required torque MDT and has an absolute value exceeding the absolute value of the threshold value α is divided into the front required torque FDT and the rear required torque RDT through the process of FIG. 2. Thus, some of the braking torque is generated from the second MG 72, and the remaining braking torque is generated from the third MG 73. Accordingly, the required braking torque is borne by both the front wheels 62F and the rear wheels 62R. Thus, as compared to when the braking torque having an absolute value exceeding the absolute value of the threshold value α is generated only from the third MG 73, the contact state of front wheels 62F and the rear wheels 62R are stable. This stabilizes the position of the vehicle 500.

Second Embodiment

The controller 100 for the vehicle 500 according to a second embodiment of the present disclosure will now be described with reference to FIGS. 6 and 7.

In the first embodiment, when a negative determination is made in the process of S310 in FIG. 4, the rear required torque RDT and the front required torque FDT are calculated by variably setting the rear distribution ratio RDR and the front distribution ratio FDR. In the second embodiment, when a negative determination is made in the process of S310 in FIG. 4, the rear required torque RDT and the front required torque FDT are calculated in a manner that differs from the manner of the first embodiment. The second embodiment will now be described focusing on such difference.

Figure 6:
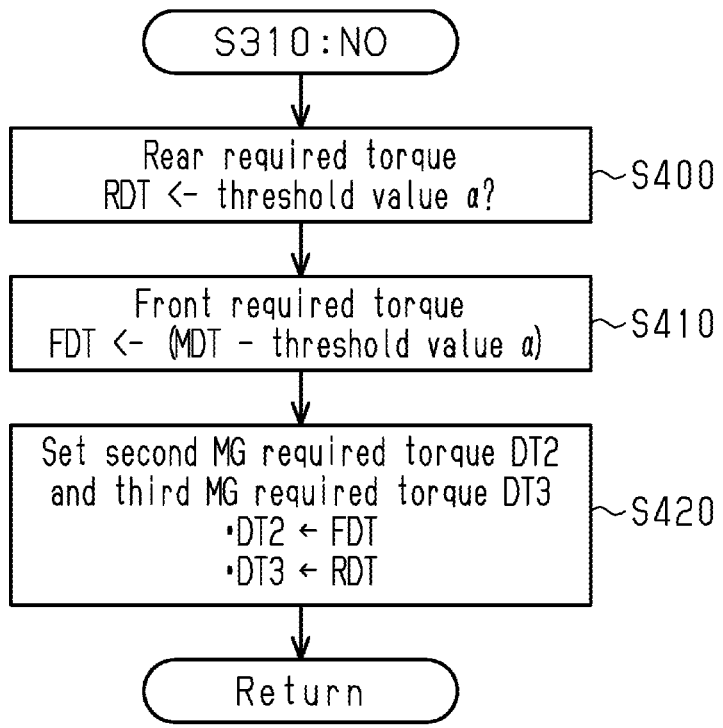
FIG. 6 is a flowchart showing a procedure for processes executed by the controller of a second embodiment.

FIG. 6 shows some of the processes executed by the controller 100 while the vehicle is traveling. The processes shown in FIG. 6 are implemented by the CPU 110 executing the programs stored in the memory 120 of the controller 100 at the given intervals. When the processes in FIG. 6 are executed, that is, when a negative determination is made in S310 shown in FIG. 4, the values calculated in the procedure illustrated in FIG. 6 are set as the second MG required torque DT2 and the third MG required torque DT3, instead of the values calculated in the procedure illustrated in FIG. 2.

As shown in FIG. 6, in the process of S310 shown in FIG. 4, when the controller 100 determines that the value of the MG required torque MDT is less than the threshold value α (S310: NO), that is, when the position of vehicle 500 is unstable in a case in which the braking torque corresponding to the MG required torque MDT is obtained only by the regenerative brake of the third MG 73, the controller 100 executes the process of S400. In this case, is less than |MDT|.

In the process of S400, the controller 100 sets the threshold value α to the rear required torque RDT.

Next, the controller 100 sets, to the front required torque FDT, the value obtained by subtracting the threshold value α from the MG required torque MDT (S410).

Subsequently, the controller 100 sets, as the second MG required torque DT2, the front required torque FDT set in the process of S410 and sets, as the third MG required torque DT3, the rear required torque RDT set in the process of S400 (S420). Then, the controller 100 temporarily ends the current process.

When the second MG required torque DT2 and the third MG required torque DT3 are set in this manner, the controller 100 performs torque control of the second MG 72 and the third MG 73 so as to obtain such types of required torque.

The operation and advantage of the present embodiment will now be described with reference to FIG. 7.

Figure 7:
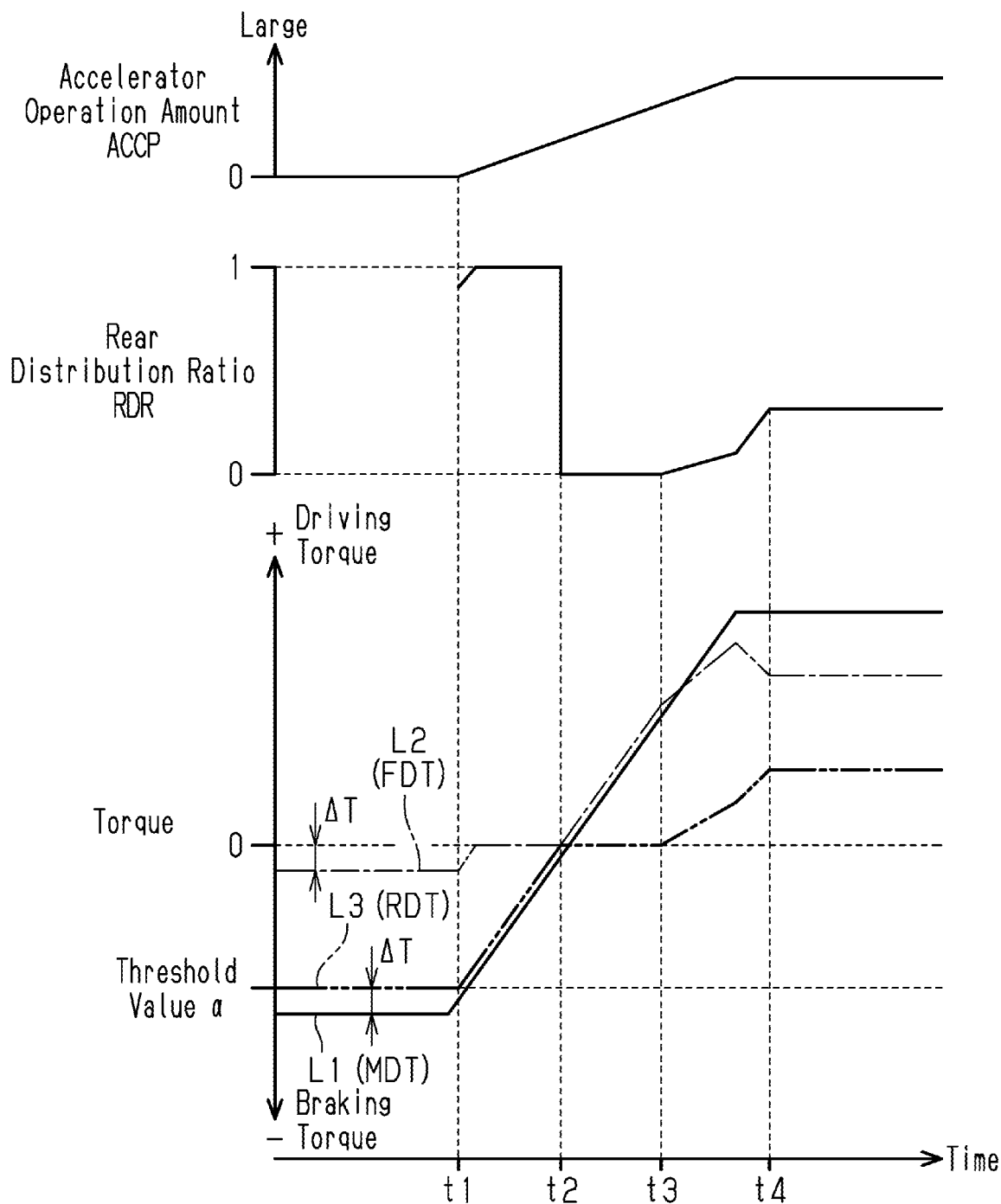
FIG. 7 is a timing chart illustrating an operation of the embodiment shown in FIG. 6.

(3) In the timing diagram of torque shown in FIG. 7, the solid line L1 represents the MG required torque MDT, and the alternate long and short dashed line L2 represents the front required torque FDT (=second MG required torque DT2). The long dashed double-short dashed line L3 represents the rear required torque RDT (=third MG required torque DT3). From time t2 to time t3, the solid line L1 corresponds to the alternate long and short dashed line L2. From time t1 to time t2, the solid line L1 corresponds to the long dashed double-short dashed line L3. In the example of FIG. 7, the vehicle speed SP is higher than the creeping speed SPC.

In FIG. 7, prior to time t1, the accelerator operation amount ACCP is 0, and the MG required torque MDT is a negative value smaller than the threshold value α (|α|<|MDT|) due to an increase in the brake operation amount BK or the like. In this case, negative determinations are made in the processes of S300 and S310 shown in FIG. 4, the position of the vehicle 500 may be unstable if the braking torque corresponding to the currently-calculated MG required torque MDT is obtained only by the regenerative brake of the third MG 73. In this case, the threshold value α is set to the third MG required torque DT3 by setting the threshold value α as the rear required torque RDT. Further, torque control is performed on the third MG 73 such that the braking torque corresponding to the threshold value α can be obtained by the regenerative brake of the third MG 73. This prevents the position of the vehicle 500 from becoming unstable and allows the braking torque corresponding to the threshold value α to act on the rear wheels 62R.

Further, when a value ΔT of the remaining braking torque that can be obtained by subtracting the threshold value α from the MG required torque MDT is set as the front required torque FDT, the value ΔT, which is such a difference and is a negative value, is set to the second MG required torque DT2. When torque control is performed on the second MG 72 such that the braking torque corresponding to the value ΔT can be obtained by the regenerative brake of the second MG 72, the braking torque corresponding to the value ΔT acts on the front wheels 62F. Accordingly, the sum of the braking torque acting on the front wheels 62F and the braking torque acting on the rear wheels 62R becomes equal to the braking torque corresponding to the MG required torque MDT. Thus, the braking torque corresponding to the MG required torque MDT can be obtained in the vehicle 500.

Thus, in the present embodiment, when the MG required torque MDT is the braking torque and the absolute value of the braking torque is greater than the absolute value of the threshold value α, some of such a braking torque corresponding to the threshold value α is generated from the third MG 73 and the remaining braking torque ΔT is generated from the second MG 72. Accordingly, in the present embodiment, as compared to when the braking torque having an absolute value exceeding the threshold value α is generated only from the third MG 73, the contact state of front wheels 62F and the rear wheels 62R are stable. This stabilizes the position of the vehicle 500.

Further, in the present embodiment, the threshold value α is treated as the braking torque generated from the third MG 73. This stabilizes the contact state of the rear wheels 62R driven by the third MG 73 while maximizing the braking torque generated from the third MG 73.

Third Embodiment

The controller 100 for the vehicle 500 according to a third embodiment of the present disclosure will now be described with reference to FIGS. 8 and 9.

In the present embodiment, when the brake pedal is operated during coasting, the second MG required torque DT2 and the third MG required torque DT3 are set as follows.

Figure 8:
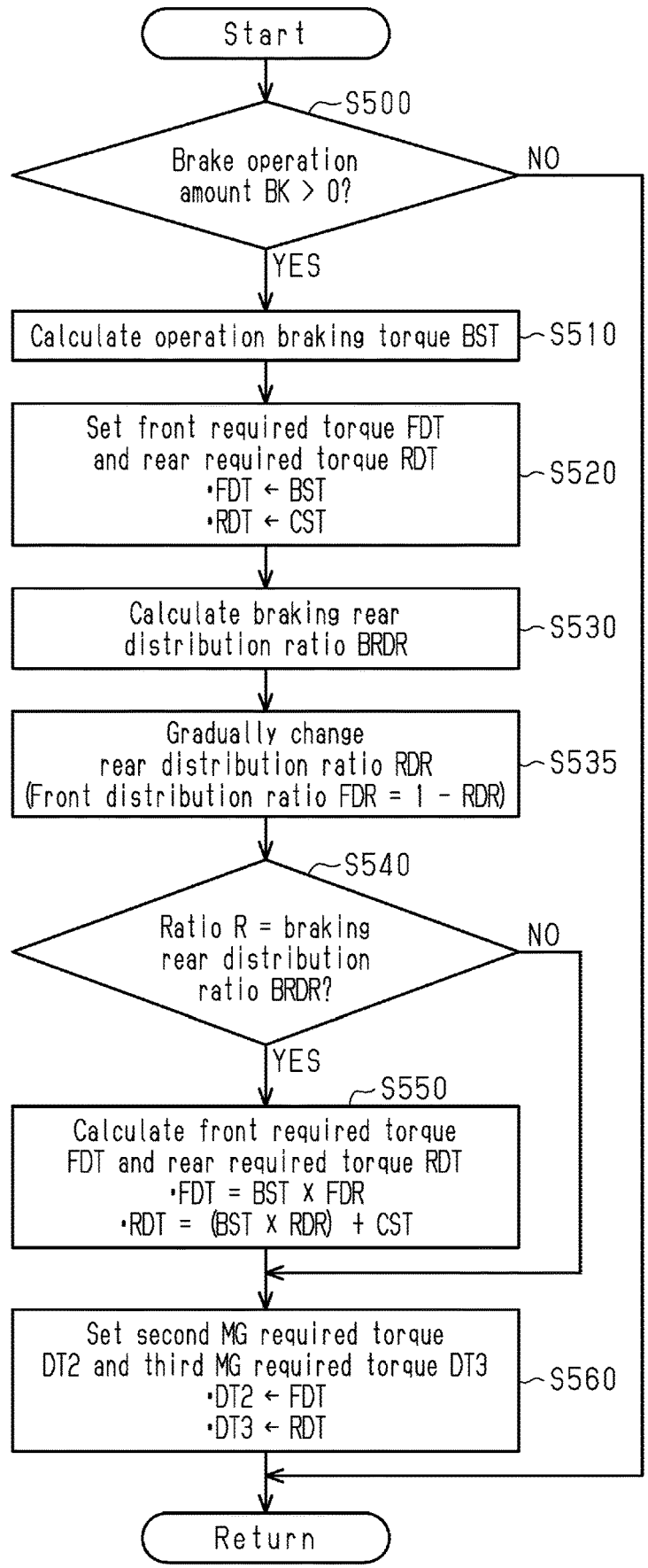
FIG. 8 is a flowchart showing a procedure for processes executed by the controller of a third embodiment.

FIG. 8 shows a procedure for processes executed by the controller 100 during coasting. The processes shown in FIG. 8 are implemented by the CPU 110 executing the programs stored in the memory 120 of the controller 100 at the given intervals. Further, the controller 100 determines whether the vehicle 500 is coasting in the process of S200 in FIG. 3.

When starting the process shown in FIG. 8, the controller 100 determines whether the current brake operation amount BK is greater than 0 (S500). When the brake operation amount BK is 0 (S500: NO), the controller 100 temporarily ends the current process.

When the brake operation amount BK is greater than 0 (S500: YES), the controller 100 calculates an operation braking torque BST, which is a required value of the regenerative brake performed by the second MG 72 and the third MG 73 in accordance with the brake operation amount BK (S510). The operation braking torque BST is calculated as a negative value of which the absolute value increases as the brake operation amount BK increases.

Next, the controller 100 sets the operation braking torque BST to the front required torque FDT and sets the coast braking torque CST to the rear required torque RDT (S520).

Subsequently, the controller 100 variably sets a braking rear distribution ratio BRDR, which is a target value of the rear distribution ratio RDR when the brake pedal is operated, in accordance with the traveling state of the vehicle or the like (S530). For example, as the ratio of the front wheel load FGL occupying the sum of the front wheel load FGL and the rear wheel load RGL increases, the controller 100 variably sets the braking rear distribution ratio BRDR such that the braking rear distribution ratio BRDR becomes a small value.

Then, the controller 100 executes the gradual changing process for gradually changing the current rear distribution ratio RDR such that the rear distribution ratio RDR changes from the currently-set value to the braking rear distribution ratio BRDR. The controller 100 sets, as the front distribution ratio FDR, the value obtained by subtracting the rear distribution ratio RDR during the gradual changing process from 1 (S535).

Next, the controller 100 uses the following expression (1) to calculate a ratio R of the rear required torque RDT occupying the braking torque given to the vehicle 500 and determines whether the ratio R is the braking rear distribution ratio BRDR (S540).

$$R = RDT/(RDT+BST) \quad (1)$$

R: Ratio of the rear required torque RDT occupying the current braking torque

RDT: Current rear required torque

BST: Operation braking torque

The current rear required torque RDT is a value that has been set in S520 and is equal to the coast braking torque CST. Thus, the value of RDT+BST is equal to the sum of the coast braking torque CST and the operation braking torque BST and corresponds to the braking torque currently given to vehicle 500. The value of RDT/(RDT+BST), in which the value of RDT+BST is set as the denominator and the current rear required torque RDT is set as the numerator is the current ratio of the rear required torque RDT occupying the braking torque given to vehicle 500, that is, a value that represents the current actual rear distribution ratio.

When determining that the ratio R is not the braking rear distribution ratio BRDR (S540: NO), the controller 100 sets, as the second MG required torque DT2, the front required torque FDT set in S520 and sets, as the third MG required torque DT3, the rear required torque RDT set in S520 (S560). Then, the controller 100 temporarily ends the current process. When making a negative determination in S540 in such a manner, the controller 100 performs torque control of the second MG 72 such that the braking torque corresponding to the operation braking torque BST can be obtained by the regenerative brake of the second MG 72. Further, the controller 100 performs torque control of the third MG 73 such that the braking torque corresponding to the coast braking torque CST can be obtained by the regenerative brake of the third MG 73.

When determining that the ratio R is the braking rear distribution ratio BRDR (S540: YES), the controller 100 calculates the front required torque FDT and the rear required torque RDT based on the following expressions (2) and (3) (S550).

$$FDT = BST \times FDR \quad (2)$$

FDT: Front required torque

BST: Operation braking torque

FDR: Front distribution ratio set in S535

$$RDT = (BST \times RDR) + CST \quad (3)$$

RDT: Rear required torque

BST: Operation braking torque

RDR: Rear distribution ratio set in S535

As shown in expression (2), when the front required torque FDT is calculated in S550, a front brake torque FBT (FBT=BST×FDR), which is a braking torque corresponding to the front distribution ratio FDR in the operation braking torque BST, is set as the front required torque FDT. As shown in expression (3), when the rear required torque RDT is calculated in S550, the sum of the braking torque corresponding to the coast braking torque CST and a rear brake torque RBT (RBT=BST×RDR), which is a braking torque corresponding to the rear distribution ratio RDR in the operation braking torque BST, is set as the rear required torque RDT.

The controller 100 sets, as the second MG required torque DT2, the front required torque FDT set in S550 and sets, as the third MG required torque DT3, the rear required torque RDT set in S550 (S560). Then, the controller 100 temporarily ends the current process. When making a positive determination in S540 in such a manner, the controller 100 performs torque control of the second MG 72 such that the braking torque corresponding to the front distribution ratio FDR in the operation braking torque BST can be obtained by the regenerative brake of the second MG 72. Further, the controller 100 performs torque control of the third MG 73 such that the sum of the braking torque corresponding to the rear distribution ratio RDR in the operation braking torque BST and the braking torque corresponding to the coast braking torque CST can be obtained by the regenerative brake of the third MG 73.

The operation and advantage of the present embodiment will now be described with reference to FIG. 9.

Figure 9:
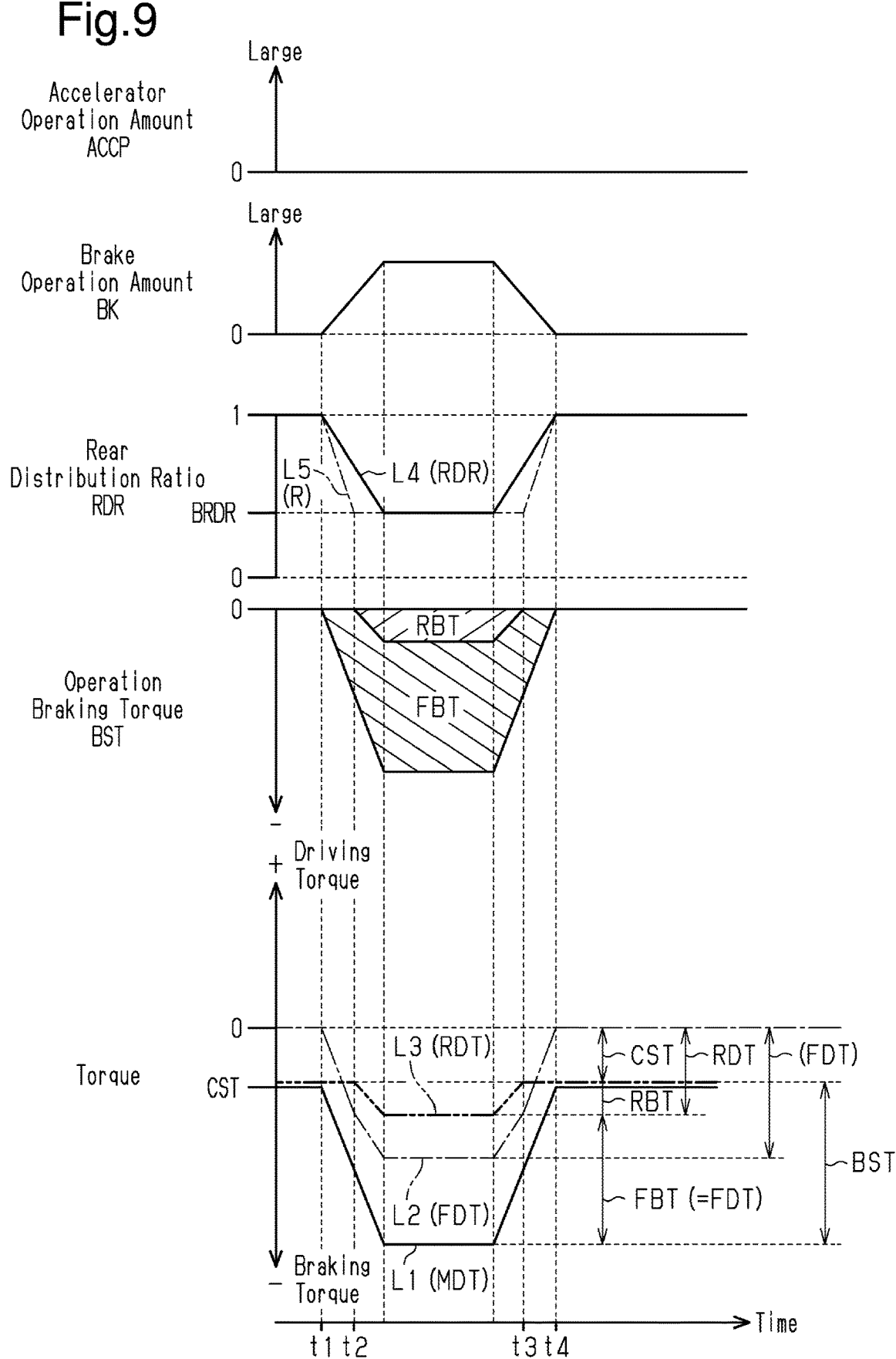
FIG. 9 is a timing chart illustrating an operation of the embodiment shown in FIG. 8.

(4) In the timing diagram of torque shown in FIG. 9, the solid line L1 represents the MG required torque MDT, which is the sum of the front required torque FDT and the rear required torque RDT, and the alternate long and short dashed line L2 represents the front required torque FDT (=second MG required torque DT2). The long dashed double-short dashed line L3 represents the rear required torque RDT (=third MG required torque DT3). Further, in the timing diagram of the rear distribution ratio in FIG. 9, the solid line L4 represents the rear distribution ratio RDR calculated in S535 of FIG. 8, and the alternate long and short dashed line L5 represents the ratio R calculated in the above-described expression (1). Prior to time t1 and subsequent to time t4, the solid line L1 corresponds to the long dashed double-short dashed line L3. In the example of FIG. 9, the vehicle speed SP is higher than the creeping speed SPC.

Prior to time t1 in FIG. 1, the accelerator operation amount ACCP and the brake operation amount BK are both 0, and the vehicle 500 is coasting. Thus, the front required torque FDT is 0, and the rear required torque RDT is the braking torque corresponding to the coast braking torque CST.

At time t1, when the brake pedal is applied to start operating the brake pedal, the brake operation amount BK becomes larger than 0. As a result, the operation braking torque BST corresponding to the brake operation amount BK increases. Whereas the value of the rear distribution ratio RDR gradually decreases toward the braking rear distribution ratio BRDR, the value of the front distribution ratio FDR gradually increases. As the operation braking torque BST increases, the value of the denominator in the expression (1) increases. Thus, the ratio R gradually decreases from 1.

Subsequent to time t1, until the value of the ratio R reaches the value of the braking rear distribution ratio BRDR (time t1 to time t2), a negative determination is made in the process of S540 shown in FIG. 8. Further, all the operation braking torque BST is set as the front required torque FDT. Thus, between time t1 and time t2, all the braking torque corresponding to the operation braking torque BST can be obtained by the regenerative brake of the second MG 72.

After time t2, while the value of the ratio R is the value of the braking rear distribution ratio BRDR (time t2 to time t3), a positive determination is made in the process of S540 shown in FIG. 8. Thus, since the operation braking torque BST is divided into the front brake torque FBT and the rear braking torque RBT, the operation braking torque BST is distributed into the front required torque FDT and the rear required torque RDT. Thus, between time t2 and time t3, the braking torque corresponding to the operation braking torque BST can be obtained by the regenerative brake of the second MG 72 and the regenerative brake of the third MG 73.

The operation braking torque BST decreases as the brake operation amount BK decreases subsequent to time t3, thereby decreasing the value of the denominator of expression (1). Thus, the value of the ratio R deviates from the matched braking rear distribution ratio BRDR and gradually changes to a large value. Thus, subsequent to time t3, since a negative determination is made again in the process of S540 in FIG. 8, all the braking torque corresponding to the operation braking torque BST can be obtained by the regenerative brake of the second MG 72 until the brake operation amount BK becomes 0.

Thus, in the present embodiment, at the initial stage in which a given period has elapsed after the brake pedal started to be operated, that is, during the period (time t1 to time t2) in which the value of the ratio R reaches the value of the braking rear distribution ratio BRDR, all the required operation braking torque BST can be obtained by the regenerative brake of the second MG 72. As a result, the braking torque is given to the front wheels 62F.

Subsequently, while the value of the ratio R remains the value of the braking rear distribution ratio BRDR (time t2 to time t3), the operation braking torque BST is divided into the front brake torque FBT and the rear brake torque RBT. As a result, the braking torque is given to both the front wheels 62F and the rear wheels 62R. In a comparative example, the operation braking torque BST is divided into the front brake torque FBT and the rear brake torque RBT from the initial stage in which the brake pedal is applied. As compared to such a comparative example, in the present embodiment, the braking torque finally borne by the rear wheels 62R is small in the required operation braking torque BST.

Even if the brake pedal is not operated during coasting, the rear wheels 62R have already received the braking torque corresponding to the coast braking torque CST. Thus, when the operation braking torque BST generated by operating the brake pedal is further added to the rear wheels 62R, the braking torque of the rear wheels 62R may be excessively large. This may destabilize the contact state of the rear wheels 62R and destabilize the position of the vehicle 500. In the present embodiment, as described above, the braking torque borne by the rear wheels 62R in the required operation braking torque BST decreases. This prevents the position of the vehicle 500 from becoming unstable.

As described in the comparative example, when the operation braking torque BST is divided into the front brake torque FBT and the rear brake torque RBT corresponding to the front distribution ratio FDR and the rear distribution ratio RDR from the initial stage in which the brake pedal is applied, the rear brake torque RBT is further added to the required torque of the third MG 73 that generates the braking torque corresponding to the coast braking torque CST. Thus, the actual rear distribution ratio (i.e., the ratio R) becomes larger than the braking rear distribution ratio BRDR by an amount corresponding to the coast braking torque CST. This makes it difficult to change the ratio R to the braking rear distribution ratio BRDR.

In the present embodiment, after the ratio R becomes the braking rear distribution ratio BRDR, the operation braking torque BST is divided into the front brake torque FBT and the rear brake torque RBT. This allows the ratio R to be easily maintained at the braking rear distribution ratio BRDR.

Fourth Embodiment

The controller 100 for the vehicle 500 according to a fourth embodiment of the present disclosure will now be described with reference to FIGS. 10 and 11.

In the fourth embodiment, when the brake pedal is operated during coasting, the second MG required torque DT2 and the third MG required torque DT3 are set in a manner that differs from the manner of the third embodiment. In the fourth embodiment, the processes of S520 and S540 are omitted from the processes shown in FIG. 8.

Figure 10:
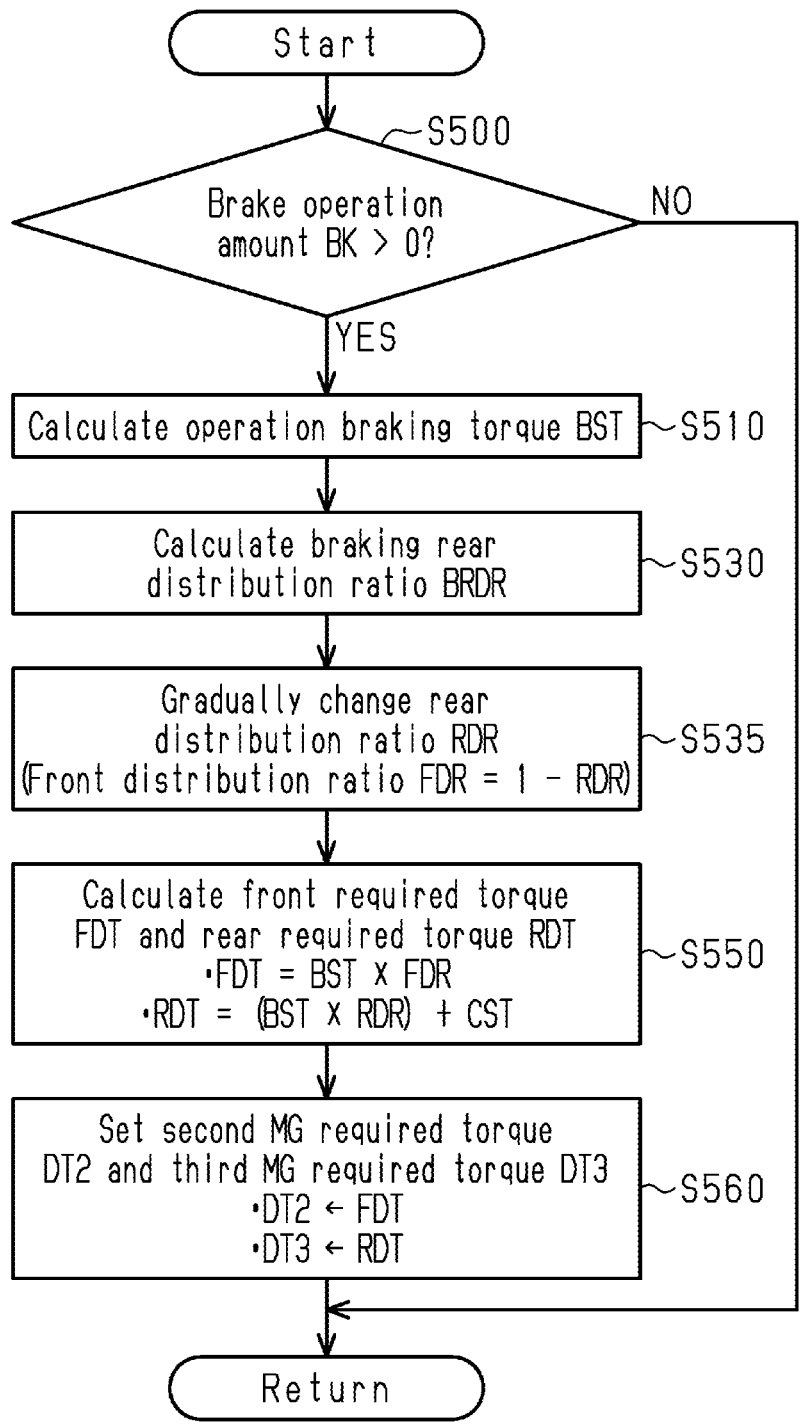
FIG. 10 is a flowchart showing a procedure for processes executed by the controller of a fourth embodiment.

FIG. 10 shows a procedure for processes executed by the controller 100 during coasting. The processes shown in FIG. 10 are implemented by the CPU 110 executing the programs stored in the memory 120 of the controller 100 at the given intervals. Further, the controller 100 determines whether the vehicle 500 is coasting in the process of S200 in FIG. 3.

When starting the process shown in FIG. 10, the controller 100 determines whether the current brake operation amount BK is greater than 0 (S500). When the brake operation amount BK is 0 (S500: NO), the controller 100 temporarily ends the current process.

When the brake operation amount BK is greater than 0 (S500: YES), the controller 100 calculates the operation braking torque BST, which is a required value of the regenerative brake performed by the second MG 72 and the third MG 73 in accordance with the brake operation amount BK (S510). The operation braking torque BST is calculated as a negative value of which the absolute value increases as the brake operation amount BK increases.

Subsequently, the controller 100 variably sets the braking rear distribution ratio BRDR, which is a target value of the rear distribution ratio RDR when the brake pedal is operated, in accordance with the traveling state of the vehicle or the like (S530). For example, as the ratio of the front wheel load FGL occupying the sum of the front wheel load FGL and the rear distribution ratio RDR increases, the controller 100 variably sets the braking rear distribution ratio BRDR such that the braking rear distribution ratio BRDR decreases.

Then, the controller 100 executes the gradual changing process for gradually changing the current rear distribution ratio RDR such that the rear distribution ratio RDR changes from the currently-set value to the braking rear distribution ratio BRDR. Further, the controller 100 sets, as the front distribution ratio FDR, the value obtained by subtracting, from 1, the rear distribution ratio RDR during the gradual changing process (S535).

Next, the controller 100 calculates the front required torque FDT and the rear required torque RDT based on expressions (2) and (3).

$$FDT = BST \times FDR \quad (2)$$

FDT: Front required torque
BST: Operation braking torque
FDR: Front distribution ratio set in S535

$$RDT = (BST \times RDR) + CST \quad (3)$$

RDT: Rear required torque
BST: Operation braking torque
RDR: Rear distribution ratio set in S535

As shown in expression (2), when the front required torque FDT is calculated in S550, a front brake torque FBT (FBT=BST×FDR), which is a braking torque corresponding to the front distribution ratio FDR in the operation braking torque BST, is set as the front required torque FDT. As shown in expression (3), when the rear required torque RDT is calculated in S550, the sum of the braking torque corresponding to the coast braking torque CST and the rear brake torque RBT (RBT=BST×RDR), which is a braking torque corresponding to the rear distribution ratio RDR in the operation braking torque BST, is set as the rear required torque RDT.

The controller 100 sets, as the second MG required torque DT2, the front required torque FDT set in S550 and sets, as the third MG required torque DT3, the rear required torque RDT set in S550 (S560). Then, the controller 100 temporarily ends the current process. Thus, the controller 100 performs torque control of the second MG 72 such that the braking torque corresponding to the front distribution ratio FDR in the operation braking torque BST can be obtained by the regenerative brake of the second MG 72. Further, the controller 100 performs torque control of the third MG 73 such that the sum of the braking torque corresponding to the rear distribution ratio RDR in the operation braking torque BST and the braking torque corresponding to the coast braking torque CST can be obtained by the regenerative brake of the third MG 73.

The operation and advantage of the present embodiment will now be described with reference to FIG. 11.

Figure 11:
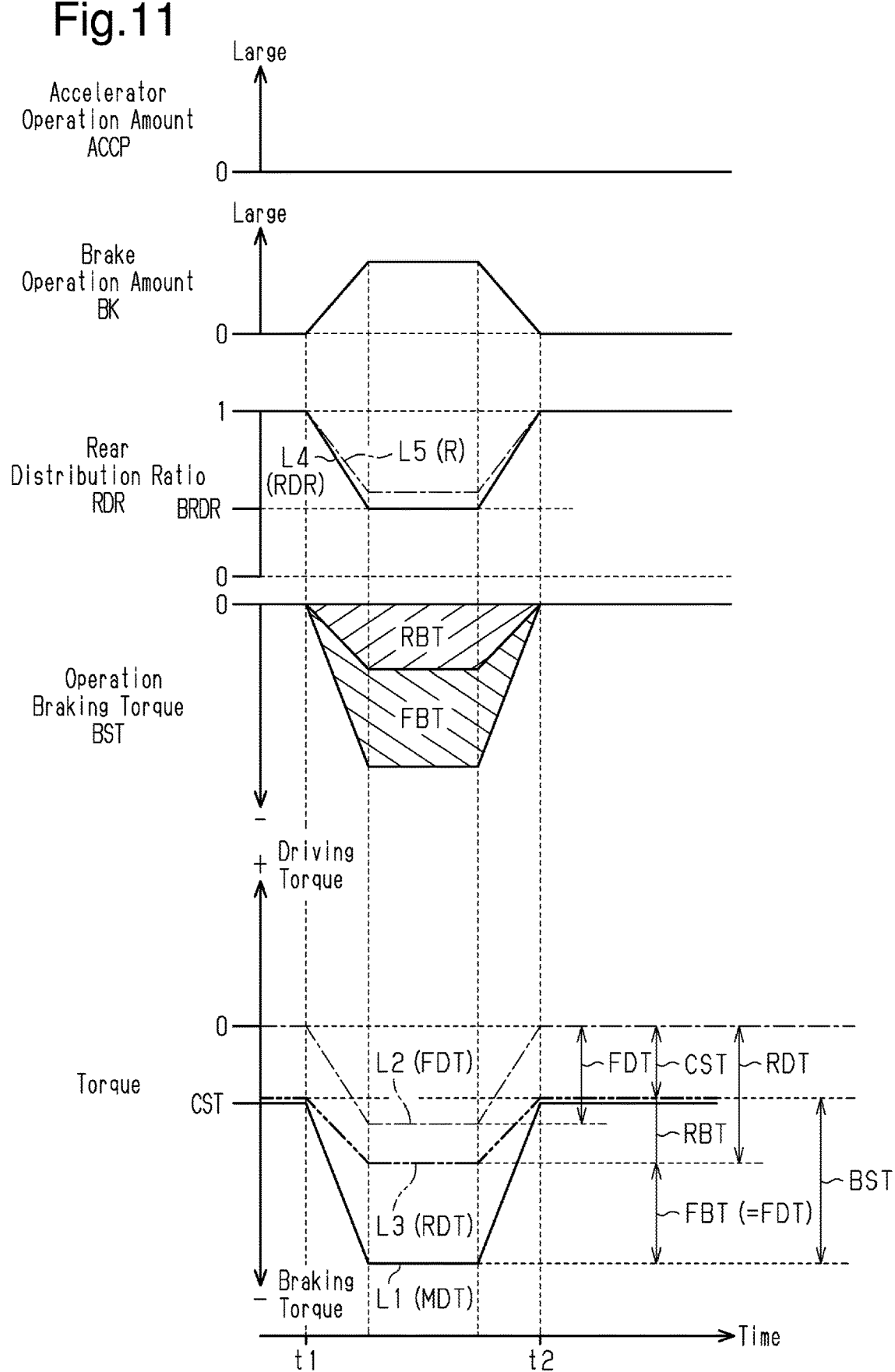
FIG. 11 is a timing chart illustrating an operation of the embodiment shown in FIG. 10.

(5) In the time chart of torque shown in FIG. 11, the solid line L1 represents the MG required torque MDT, which is the sum of the front required torque FDT and the rear required torque RDT. The alternate long and short dashed line L2 represents the front required torque FDT (=second MG required torque DT2), and the long dashed double-short dashed line L3 represents the rear required torque RDT (=third MG required torque DT3). Further, in the timing diagram of the rear distribution ratio in FIG. 11, the solid line L4 represents the rear distribution ratio RDR calculated in S535 of FIG. 8. The alternate long and short dashed line L5 represents changes in the ratio R calculated based on the above-described expression (1). Prior to time t1 and subsequent to time t2, the solid line L1 corresponds to the long dashed double-short dashed line L3. In the example of FIG. 11, the vehicle speed SP is higher than the creeping speed SPC.

Prior to time t1 in FIG. 11, the accelerator operation amount ACCP and the brake operation amount BK are 0, and the vehicle 500 is coasting. Thus, the front required torque FDT is 0, and the rear required torque RDT is the braking torque corresponding to the coast braking torque CST.

At time t1, when the brake pedal is applied, the brake operation amount BK becomes larger than 0. As a result, the operation braking torque BST corresponding to the brake operation amount BK increases. Whereas the value of the rear distribution ratio RDR gradually decreases toward the braking rear distribution ratio BRDR, the value of the front distribution ratio FDR gradually increases. As the operation braking torque BST increases, the value of the denominator in expression (1) increases. Thus, the ratio R gradually decreases from 1.

Subsequent to time t1, the operation braking torque BST is divided into the front brake torque FBT and the rear brake torque RBT until the brake operation amount BK becomes 0 (time t2). Thus, the operation braking torque BST is distributed to the front required torque FDT and the rear required torque RDT. Accordingly, while the brake pedal is operated, the braking torque corresponding to the operation braking torque BST is obtained by the regenerative brake of the second MG 72 and the regenerative brake of the third MG 73. As a result, the braking torque is given to both the front wheels 62F and the rear wheels 62R.

Thus, in the present embodiment, the operation braking torque BST is distributed to both the front wheels 62F and the rear wheels 62R. Thus, for example, as compared to when all the operation braking torque BST is given to only one of the front wheels 62F and the rear wheels 62R, the contact state of the front wheels 62F and the rear wheels 62R is stable in the present embodiment. This stabilizes the position of the vehicle 500 when the brake pedal is applied.

In the fourth embodiment, as described in the third embodiment, the operation braking torque BST is divided into the front brake torque FBT and the rear brake torque RBT from the initial stage in which the brake pedal is applied so that the operation braking torque BST is distributed to the front required torque FDT and the rear required torque RDT (refer to expressions (2) and (3)). Thus, the rear brake torque RBT is further added to the required torque of the third MG 73 that generates the braking torque corresponding to the coast braking torque CST. Thus, in the fourth embodiment, the actual rear distribution ratio (i.e., the ratio R) becomes larger than the braking rear distribution ratio BRDR by an amount corresponding to the coast braking torque CST. Accordingly, in some cases, the ratio R does not become the braking rear distribution ratio BRDR.

The above-described embodiments may be modified as follows. The above-described embodiments and the following modifications can be combined as long as the combined modifications remain technically consistent with each other.

In the third embodiment, all the operation braking torque BST is set to the front required torque FDT until the given period has elapsed since the brake pedal was operated. By the given period, the value of the ratio R reaches the value of the braking rear distribution ratio BRDR after the brake pedal is operated. The given period may be changed. For example, the time elapsed from when the brake pedal starts to be operated may be measured to set, as the given period, a period until the measured time reaches a set time.

During the execution of the torque limit process, the rear required torque RDT is set to 0. As long as the generation of the above-described torque shock can be limited, the rear required torque RDT may be set to a value approximate to 0.

During coasting, the rear distribution ratio RDR is set to 1. As long as the operation and advantages of each of the above-described embodiments, the rear distribution ratio RDR may be set to a value approximate to 1.

During coasting, the coast braking torque CST is given to the rear wheels 62R, and the driving torque in the torque limit process is given to the front wheels 62F. Instead, during coasting, the front required torque FDT may be set such that the coast braking torque CST is given to the front wheels 62F, and the rear required torque RDT may be set such that the driving torque during the torque limit process is given to the rear wheels 62R. That is, while the third MG 73 corresponds to the first prime mover and the second MG 72 corresponds to the second prime mover in each of the above-described embodiments, the second MG 72 may correspond to the first prime mover and the third MG 73 may correspond to the second prime mover.

During coasting, the coast braking torque CST is given to the rear wheels 62R. The drive wheel receiving the coast braking torque CST may be variably set in accordance with, for example, the state of the vehicle or the state of a travel road surface. For example, when lubricant that lubricates the vehicle drive system has a low temperature and a high viscosity, the occurrence of the above-described torque shock is limited. Thus, when the lubricant has a low temperature, the coast braking torque CST may be given to the drive wheel where the torque shock is likely to occur.

When the travel road surface is an uphill road and the inclination angle SA of the travel road surface is large, the front wheel load FGL is small. In such a case, when the braking torque is given to the front wheels 62F, the contact state of the front wheels 62F may be worsened. Thus, in such a case, the coast braking torque CST may be given to the rear wheels 62R. When the travel road surface is a downhill road and the inclination angle SA of the travel road surface is large, the rear wheel load RGL is small. In such a case, when the braking torque is given to the rear wheels 62R, the contact state of the rear wheels 62R may be worsened. Thus, in such a case, the coast braking torque CST may be given to the front wheels 62F.

In a case in which the friction coefficient μ of a road surface is small, when the braking torque is given to the rear wheels 62R, the contact state of the rear wheels 62R may be worsened. Thus, in such a case, the coast braking torque CST may be given to the front wheels 62F.

The hybrid mechanism that drives the front wheels 62F of the vehicle 500 includes the internal combustion engine 10, the first MG 71, and the second MG 72. Instead, other hybrid mechanisms may be employed. For example, a one-motor hybrid mechanism including an internal combustion engine and one motor generator may be employed.

Figure 12:
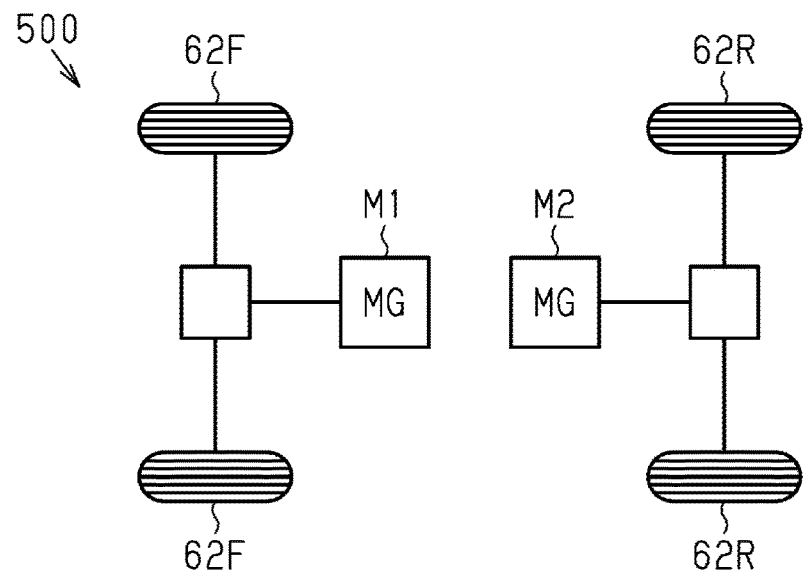
FIG. 12 is a schematic diagram showing the configuration of the vehicle according to a modification of the first embodiment.

As shown in FIG. 12, the vehicle 500 does not have to include the internal combustion engine 10 and may include a motor generator M1, which drives the front wheels 62F, and a motor generator M2, which drives the rear wheels 62R. For example, the motor generator M2 may correspond to the first prime mover, and the motor generator M1 may correspond to the second prime mover, and vice versa.

Figure 13:
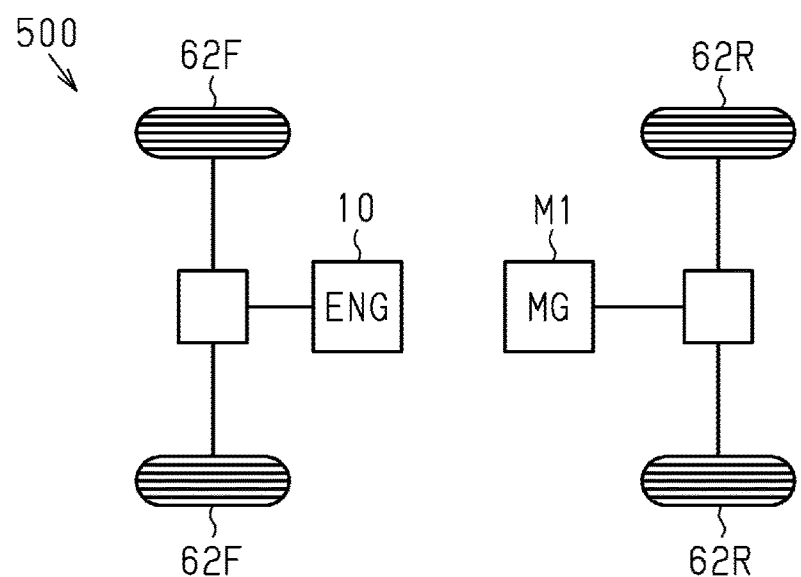
FIG. 13 is a schematic diagram showing the configuration of the vehicle according to another modification of the first embodiment.

As shown in FIG. 13, in the vehicle 500, the front wheels 62F may be driven only by the internal combustion engine 10, and the rear wheels 62R may be driven only by the motor generator M1. In this case, the advantages equivalent to those described above are obtained by replacing the second MG required torque DT2 of the control of each of the above-described embodiments with the required torque of the internal combustion engine 10. For example, the motor generator M1 may correspond to the first prime mover, and the internal combustion engine 10 may correspond to the second prime mover. Alternatively, in the manner opposite to the configuration of FIG. 13, the rear wheels 62R may be driven only by the internal combustion engine 10, and the front wheels 62F may be driven only by the motor generator M1. In this case, the advantages equivalent to those described above are obtained by replacing the third MG required torque DT3 of the control of each of the above-described embodiments with the required torque of the internal combustion engine 10. For example, the internal combustion engine 10 may correspond to the first prime mover, and the motor generator M1 may correspond to the second prime mover.

In each of the above-described embodiments, the front distribution ratio FDR and the rear distribution ratio RDR are calculated such that the MG required torque MDT is divided into the front required torque FDT and the rear required torque RDT. Instead, the MG required torque MDT may be divided into the front required torque FDT and the rear required torque RDT in other manners without calculating the front distribution ratio FDR and the rear distribution ratio RDR.

The accelerator operation amount ACCP, which is detected by the acceleration position sensor 84, does not necessarily have to be the operation amount of the accelerator pedal but may also include the operation amount of a switch or the like for performing an acceleration operation. The brake operation amount BK, which is detected by the brake sensor 85, does not necessarily have to be the operation amount of the brake pedal but may also include the operation amount of a switch or the like for performing a brake operation.

The controller 100 is not limited to a device that includes the CPU 110 and the memory 120 and executes software processing. For example, a dedicated hardware circuit (such as an ASIC) may be provided that executes at least part of the software processing executed in each of the above-described embodiments. That is, the controller 100 may be modified as long as it has any one of the following configurations (a) to (c). (a) A configuration including a processor that executes all of the above-described processes according to programs and a program storage device such as a memory that stores the programs (including a non-transitory computer readable storage medium). (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a vehicle, comprising:
control circuitry configured to
control a prime mover for driving a front wheel and a prime mover for driving a rear wheel, wherein
one of the prime mover that drives the front wheel and the prime mover that drives the rear wheel is referred to as a first prime mover and the other one of the prime mover that drives the front wheel and the prime mover that drives the rear wheel is referred to as a second prime mover, and
the control circuitry is further configured to execute:
a process for generating, when a required torque required for a drive wheel of the vehicle is a braking torque, the braking torque from the first prime mover;
a torque limit process for limiting, when the required torque changes from the braking torque to a driving torque, and the torque generated by the first prime mover is changed from the braking torque to the driving torque, an increase in the driving torque generated from the first prime mover during a set period; and
a process for generating, from the second prime mover that does not generate the braking torque, the driving torque required during execution of the torque limit process.

2. The controller according to claim 1, wherein the control circuitry is configured to execute a process for generating a portion of the braking torque that does not cause a position of the vehicle to become unstable from the first prime mover and generating a remaining portion of the braking torque from the second prime mover when an absolute value of the braking torque exceeds a set threshold value.

3. The controller according to claim 1, wherein the control circuitry is configured to execute a process for generating a braking torque corresponding to a set threshold value from the first prime mover and generating a braking torque corresponding to an amount exceeding the threshold value from the second prime mover when an absolute value of the braking torque exceeds the threshold value.

4. The controller according to claim 1, wherein the control circuitry is configured to execute:
a process for calculating an operation braking torque that is a braking torque corresponding to an operation amount of a brake pedal in a case in which the brake pedal is operated while the vehicle is traveling;
a process for generating the operation braking torque from the second prime mover until a given period has elapsed from when the brake pedal started to be operated; and
a process for generating a portion of the braking torque of the operation braking torque that does not cause a position of the vehicle to become unstable from the second prime mover and generating a remaining portion of the braking torque from the first prime mover after the given period has elapsed.

5. The controller according to claim 1, wherein the control circuitry is configured to execute:
a process for calculating an operation braking torque that is a braking torque corresponding to an operation amount of a brake pedal in a case in which the brake pedal is operated while the vehicle is traveling; and
a process for generating a portion of the braking torque of the operation braking torque that does not cause a position of the vehicle to become unstable from the second prime mover and generating a remaining portion of the braking torque from the first prime mover after the brake pedal starts to be operated.

6. A method for controlling a vehicle executed by a controller for the vehicle, wherein the vehicle includes a prime mover that drives a front wheel and a prime mover that drives a rear wheel, and one of the prime mover that drives the front wheel and the prime mover that drives the rear wheel is referred to as a first prime mover and the other one of the prime mover that drives the front wheel and the prime mover that drives the rear wheel is referred to as a second prime mover, the method comprising:
generating, when a required torque required for a drive wheel of the vehicle is a braking torque, the braking torque from the first prime mover;
limiting, when the required torque changes from the braking torque to a driving torque, and the torque generated by the first prime mover is changed from the braking torque to the driving torque, an increase in the driving torque generated from the first prime mover during a set period; and
generating, from the second prime mover that does not generate the braking torque, the driving torque required during the set period.

7. A non-transitory computer readable storage medium storing a program that causes a controller for a vehicle to execute a process for controlling the vehicle, wherein the vehicle includes a prime mover that drives a front wheel and a prime mover that drives a rear wheel, and one of the prime mover that drives the front wheel and the prime mover that drives the rear wheel is referred to as a first prime mover and the other one of the prime mover that drives the front wheel and the prime mover that drives the rear wheel is referred to as a second prime mover, the process comprising:
generating, when a required torque required for a drive wheel of the vehicle is a braking torque, the braking torque from the first prime mover;
limiting, when the required torque changes from the braking torque to a driving torque, and the torque generated by the first prime mover is changed from the braking torque to the driving torque, an increase in the driving torque generated from the first prime mover during a set period; and generating, from the second prime mover that does not generate the braking torque, the driving torque required during the set period.

8. The controller according to claim 1, wherein the control circuitry is configured to execute the process for generating the braking torque from the first prime mover when the vehicle is coasting.

9. The method according to claim 6, wherein the generating the braking torque from the first prime mover is performed when the vehicle is coasting.

10. The non-transitory computer readable storage medium according to claim 7, wherein the process for generating the braking torque from the first prime mover is executed when the vehicle is coasting.

* * * * *